US005430999A

United States Patent [19]
Grant

[11] Patent Number: 5,430,999
[45] Date of Patent: Jul. 11, 1995

[54] TREE TRIMMING AND PRUNING MACHINE

[76] Inventor: Spencer A. Grant, 1220 Millers Mill Rd., Stockbridge, Ga. 30281

[21] Appl. No.: 299,845
[22] Filed: Sep. 1, 1994
[51] Int. Cl.⁶ .................... A01D 55/00; A01D 34/66
[52] U.S. Cl. ............................. 56/11.9; 56/15.2; 56/235; 56/6
[58] Field of Search ............ 56/235, 233, 11.9, 15.2, 56/13.5, 13.6, 6

[56] References Cited

U.S. PATENT DOCUMENTS

| | | | |
|---|---|---|---|
| Re. 26,793 | 4/1963 | Patterson et al. | 56/235 |
| 3,138,911 | 7/1962 | Pounds | 56/235 |
| 3,157,016 | 5/1963 | Leydig et al. | 56/235 |
| 3,192,695 | 7/1965 | Leydig et al. | 56/235 |
| 3,246,460 | 4/1966 | Patterson et al. | 56/235 |
| 3,343,575 | 9/1967 | Trout | 144/34 |
| 3,415,046 | 12/1968 | Leydig et al. | 56/235 |
| 3,487,615 | 1/1970 | Leydig et al. | 56/235 |
| 3,774,380 | 11/1973 | Ancellin | 56/11.9 |
| 3,913,304 | 10/1975 | Jodoin | 56/233 |
| 3,952,485 | 4/1976 | McRobert | 56/235 |
| 4,067,178 | 1/1978 | Miller | 56/235 |
| 4,206,585 | 6/1980 | Pollock | 56/235 |
| 4,302,922 | 12/1981 | Guerndt, Jr. et al. | 56/235 |
| 4,383,400 | 5/1983 | Mead et al. | 56/233 |
| 4,411,070 | 10/1983 | Boyum et al. | 30/379.5 |
| 4,442,658 | 4/1984 | Cartner | 56/11.9 |
| 4,455,815 | 6/1984 | Grant | 56/235 |
| 4,506,464 | 3/1985 | Cartner | 56/11.9 X |
| 4,577,457 | 3/1986 | Grant | 56/235 |
| 4,627,227 | 12/1986 | Dixon | 56/235 |
| 4,887,416 | 12/1989 | Crane et al. | 56/13.6 |
| 5,210,997 | 5/1993 | Mountcastle, Jr. | 56/11.9 X |
| 5,291,723 | 3/1994 | Lindsey | 56/235 |

FOREIGN PATENT DOCUMENTS

| | | | |
|---|---|---|---|
| 790254 | 2/1958 | United Kingdom | 56/235 |
| 2018558 | 10/1979 | United Kingdom | 56/235 |
| 507272 | 4/1976 | U.S.S.R. | |
| 938829 | 6/1982 | U.S.S.R. | 56/235 |

Primary Examiner—Stephen J. Novosad
Attorney, Agent, or Firm—James A. Hinkle

[57] ABSTRACT

A tree-trimming and phoning machine has a cutter bar (2) with a plurality of in-line-staggered rotary cutter blades (1) that are rotated by a separate hydraulic motor (12) for each one of the plurality of the rotary cutter blades. A resulting plurality of blade-turning hydraulic motors (12) are connected in series to a hydraulic-motor line 15. Hydraulic relief lines (23) are in pressure-spike-relief communication between hydraulic-motor lines (1 5) intermediate the hydraulic motors (12) and a hydraulic manifold or header (24). The cutter bar is attachable to a single side or to both sides of a hydraulic lifting means (5) such as employed for standard front-end loaders, fork lifts and other lifting means that are attachable to a vehicle (6) such as a tractor. The hydraulic lifting means is maneuverable university to select positions of trimming, pruning and cutting-load dumping. A selection of sizes of saw-blade cutter bars are attachable to a variety of hydraulic lifting and maneuvering machines that are attachable to a variety of sizes and types of agricultural and industrial tractors.

11 Claims, 4 Drawing Sheets

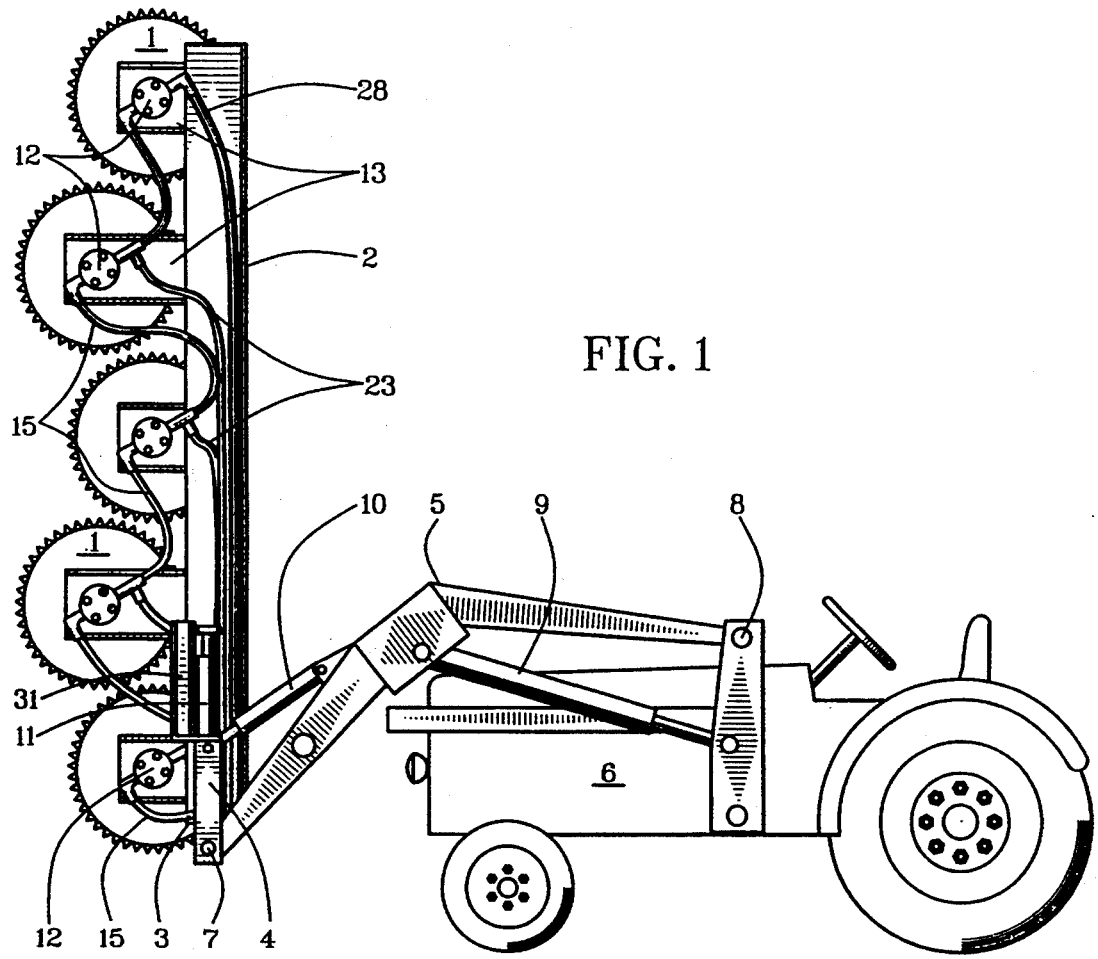
FIG. 1
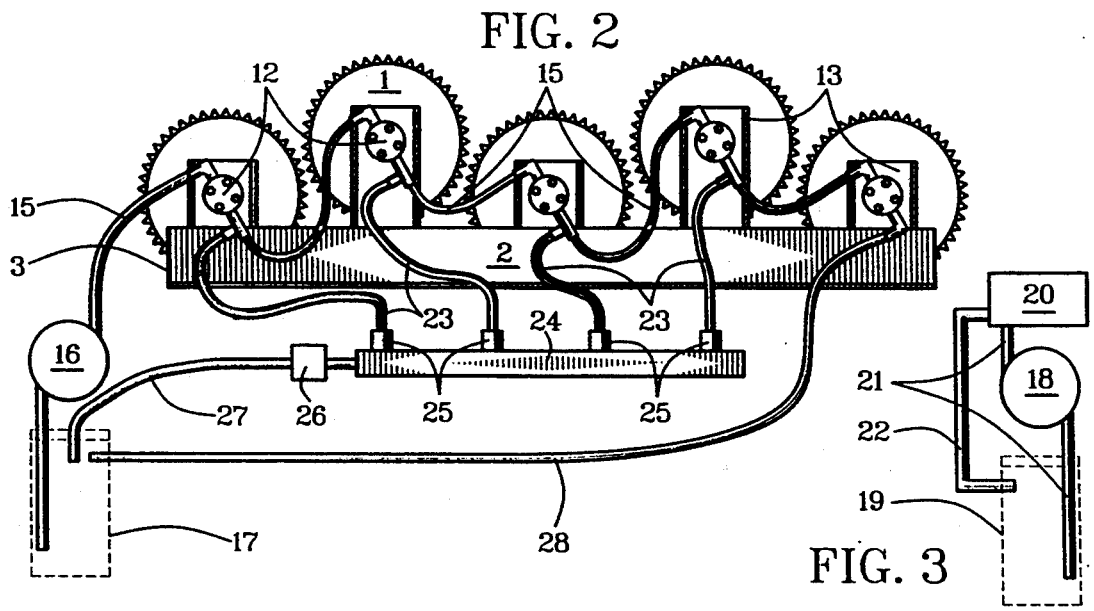
FIG. 2
FIG. 3

TREE TRIMMING AND PRUNING MACHINE

BACKGROUND OF THE INVENTION

I. Field of the Invention

The present invention relates generally to the field of tree-trimming machinery and in particular it relates to series connection of a hydraulic-motor line to a plurality of hydraulic motors that rotate a plurality of staggered rotary cutter blades on cutter bars that are maneuverable universally on vehicles.

II. Description of the Prior Art

There are a wide variety of rotary saws mounted on vehicles for trimming and pruning trees. None, however, have a separate hydraulic motor for each of a plurality of rotary cutters mounted in line on a self-cleaning cutter bar in a manner taught by this invention. An example of related but different devices is is described in U.S. Pat. No. 3,246,460 granted to Patterson et al. The Patterson device taught a plurality of belt-driven rotary saws on each of a plurality of saw carriers that were pivotal. It was not an in-line series of hydraulic-powered rotary saws as described by this invention. U.S. Pat. No. 3,138,911 granted to Pounds described an in-line series of belt-driven rotary cutters on a boom mechanism that was attached to a mid section of a tractor. U.S. Pat. No. 3,1912,695 granted to Leydig et al taught staggering of a plurality of rotary cutting blades on a cutter bar with a different working relationship of parts than in this invention to prevent passage of uncut items between the rotary cutting blades. Known prior art most closely related to this invention, however, is an agricultural machine referred to as a Combined Hedger-Topper described in U.S. Pat. No. 4,067,178 granted to Miller.

Basically, the Miller patent is limited to a vehicle having a pair of two elongate booms rotatively mounted on a base member with which the two elongate booms are mounted on the vehicle. The two booms are adjustable for "heightwise" movement and for rotational orientation with respect to the ground. A plurality of power-driven saw blades are spaced apart on each of the two booms that thereby become saw booms.

Beyond these basic limitations, the Miller patent further limits itself to description of the base member as being a base portion of a U-shaped member that is attached pivotally to the vehicle for selective rotation thereabout. Then it describes hydraulic means for movement of the U-shaped member. In relation to hydraulic equipment, it then further limits itself to hydraulic means that rotate the saw blades and propel the vehicle in a combined working relationship. Finally, the Miller patent limits itself to double-end steering of the vehicle in combination with the hydraulic means that rotates the saw blades.

The instant invention is not limited to two saw booms. It can have one. It is not limited to attachment of two booms to a base member that is mounted on a vehicle. Instead, one or more cutter bars having a plurality of in-line-staggered saw blades can be attachable to conventional fasteners for lifting and maneuvering means such as scoop supports that are hydraulically operated on conventional front-end loaders and similar materials-handling equipment. The hydraulic system is not limited to use in conjunction with power transmission to wheels of a vehicle but instead, can be either independent from a vehicle hydraulic means or a take-off from a vehicle hydraulic means that is not limited to use with power transmission to wheels of the vehicle.

Attachability to conventional equipment such as operational components of a conventional front-end loader has utility of low cost and convenience with high reliability. It eliminates need for single-purpose or highly specialized hydraulic material-handling equipment. A tractor fitted with a front-end loader can be fitted also with a tree-trimmer and pruning machine when needed intermittently or permanently. Optionally also, a tree-trimmer and pruning machine can be attached to each side of conventional equipment such as scoop fasteners for front-end-loaders to provide a two-sided tree-trimmer and pruning machine.

Further optional, different sizes of tractors and related equipment such as front-end loaders can be used for supporting and maneuvering different sizes or the same sizes of tree-trimmer and pruning machines. Some large tractors have sufficiently large-capacity hydraulic systems that they do not need separate hydraulic systems for operating hydraulic motors to rotate the rotary saw blades. However, the larger tractors may be too large for maneuverability in close-rowed trees and shrubs that need trimming and pruning. Low-cost adaptability to a wide variety of horticultural conditions and preferences is made possible by differences of this invention from the Miller device and from any other known tree trimmers and pruners.

In limiting itself to use of hydraulic means for interrelated transmission of power to wheels of a vehicle and to saw blades, the Miller patent expressed preference for use of a single hydraulic motor over a plurality of hydraulic motors for rotating a plurality of rotary saw blades on its two saw booms. This preference evidenced unfamiliarity with teachings of this invention for use of pressure-relief lines between each of a plurality of hydraulic motors and a hydraulic header. It evidenced lack of a solution to or unawareness of rotational resistance from difficult cutting conditions at one cutter blade stopping or slowing all cutter blades when ganged to a single rotational power source. In addition, it evidenced unawareness of physical as well as economic advantages to a hydraulic system for the rotary saw blades that is separate from a locomotive power source for a vehicle on which it is used.

The Miller patent's limitation to a specialized vehicle necessitated excessive vehicle length for which its double-end turning with hydraulic power became necessary to approach shorter turning radius that is inherent in conventional tractors to which the instant tree trimmer and pruner is attachable. Most tractors to which the instant invention is attachable, particularly those with a single front wheel, are equipped to turn in their own length or width by merely braking one rear wheel independently in a direction of turning. This allows them to turn between close rows of trees or even to circle a tree for round hedging or pruning when desired.

At high portions of tall trees, the hydraulic lifting means to which the instant invention is attachable is positioned towards a rear portion of the tractor to which it is attached and can turn in yet smaller circles for circle-hedging individual trees. For circle-hedging shorter trees having smaller diameters, a saw-blade cutter bar of this invention can be mounted aft of a hydraulic lifting means to position it for a shorter radius of rotation on a tractor with one rear wheel braked for a pivot point around which the remaining rear wheel rotates the tractor. The tractor then rotates in its own width which is shorter than rotating in its own length. The aft positioning of the cutter bar then turns in a smaller diameter than the width of the tractor.

Small-diameter turning of this nature is particularly important for hedge-pruning decorative trees. Christmas trees are a typical example. They can be made ideally round, tapered conically and sized for diameter and height with this invention. Other garden trees, shrubs and orchard trees can be shaped in any desired symmetrical shape and size. A small tractor with a small version of this invention can be used for custom hedging, pruning and shaping of small trees such as Christmas trees and some types of garden trees. None of this is possible with the Miller device.

All of the functions of the Miller device can be accomplished with the instant invention, however, and more. It can all be done at lower initial cost and with reliability of proven tractors that are available on the market and that are being improved constantly in ways that enhance continually their benefit for use with the instant invention.

SUMMARY OF THE INVENTION

In accordance with the present invention, it is contemplated that in light of problems that exist in this field, objectives of this invention are to provide a tree-trimming and pruning machine which:

Has smooth and reliable operation of a plurality of in-line-staggered saw blades that are rotated by a separate hydraulic motor for each one of the plurality of the saw blades with the resulting plurality of hydraulic motors being connected in series to a hydraulic line;

Has a saw-blade cutter bar that can be maneuvered universally for horticultural trimming and pruning, including being tilted as necessary for dumping and clearing of cuttings;

Can be attached singly to a side of a conventional hydraulic lifting means such as used for tractor-mounted front-end loaders, fork lifts and other lift mechanisms for single-side operation;

Can be attached in tandem to opposite sides of a conventional hydraulic lifting means such as used for tractor-mounted front-end loaders, fork lifts and other lift mechanisms for double-side trimming and pruning of adjacent sides of rows of horticultural plants;

Can be positioned for maneuverability to select positioning relative to a front end of a tractor which can be brake-turned for variable-radius circular trimming and for short-distance maneuverability in relation to single plants, multiple plants and rows of plants; and Can be attached to a wide variety of sizes and types of loader-type lifting means on a wide variety of multipurpose tractors as well as specialized tractors.

This invention accomplishes the above and other objectives with a tree-trimming and pruning machine having a cutter bar with a plurality of in-line-staggered rotary cutter blades that are rotated by a separate hydraulic motor for each one of the plurality of the rotary cutter blades. A resulting plurality of blade-turning hydraulic motors are connected in series to a hydraulic-motor line. Hydraulic relief lines are in pressure-spike-relief communication between hydraulic lines intermediate the hydraulic motors and a hydraulic manifold or header. The cutter bar is attachable to a single side or to both sides of a hydraulic lifting means such as employed for a standard lift means that is attached to a tractor. The hydraulic lifting means is maneuverable universally to select positions for trimming, pruning and cutting-load dumping. A selection of sizes of saw-blade cutter bars are attachable to a variety of hydraulic lifting and maneuvering machines that are attachable to a variety of sizes and types of agricultural and industrial tractors.

Other objects, advantages and capabilities of the invention will become apparent from the following description taken in conjunction with the accompanying drawings showing preferred embodiments of the invention.

BRIEF DESCRIPTION OF THE DRAWINGS

FIG. 1 is a side elevation view with a cutter bar in a low vertical mode and with rotary cutter blades in linear mode;

FIG. 2 is a schematic representation of an arrangement of hydraulic motors in relation to relief lines and a hydraulic system;

FIG. 3 is a schematic representation of a hydraulic system for a vehicle;

DESCRIPTION OF THE PREFERRED EMBODIMENTS

Figure 4:
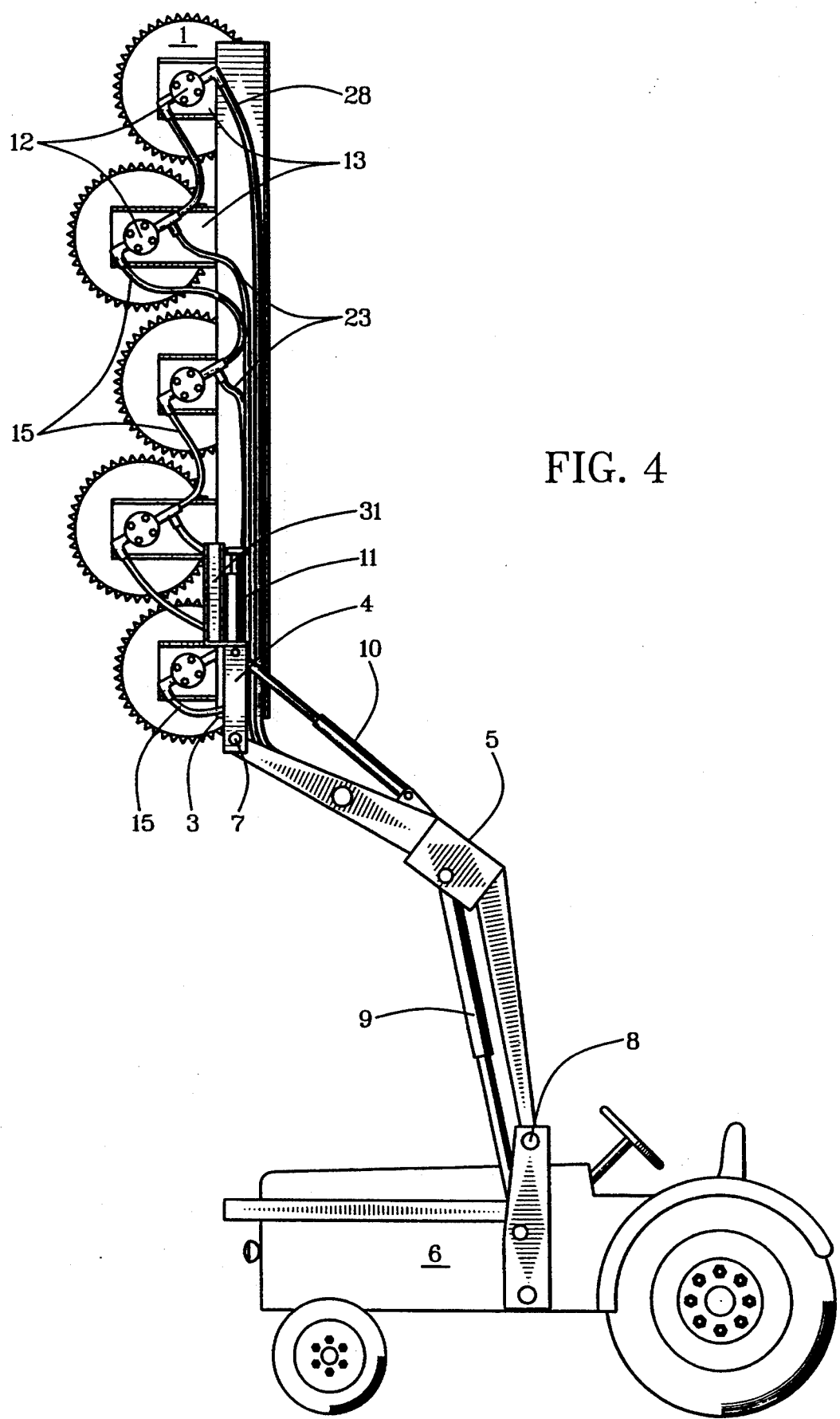
FIG. 4 is a side elevation view with a cutter bar in a raised vertical node and with saw blades in linear mode.

Referring to the drawings wherein like reference numerals designate corresponding parts throughout the several figures, wherein reference is made first to FIG. 1 primarily, and to other figures as indicated. A plurality of rotary cutter blades 1 are staggered in line on a cutter bar 12. A base end 3 of the cutter bar 12 is attached pivotally to an operative end 4 of a hydraulically operative lifting means 5 positioned on a vehicle 6. The operative end 4 of the hydraulically operative lifting means 5 is pivotal on an operative-end axle 7 that is perpendicular to a vertical lifting plane of the hydraulically operative lifting means 5. The hydraulically operative lifting means 5 is rotative on lifter axles 8 and actuated by hydraulic-lift actuators 9 for pivotal lifting in vertical planes for various types of hydraulically operative lifting means 5 to which this tree-trimming and pruning machine is attachable. An operative-end hydraulic actuator 10 is in hydraulically pivot-causing relationship between the hydraulically operative lifting means 5 and the operative end 4. A lateral hydraulic actuator 11 is in pivot-causing relationship laterally between the cutter bar 12 and the operative end 4 of the hydraulically operative lifting means 5 as illustrated further in the front view of FIG. 6.

Reference is made now to FIGS. 1-3. Each one of the plurality of rotary cutter blades 1 is rotated by a separate one of a series of hydraulic motors 112 that are attached to an appropriately sized motor mount 13 on the cutter bar 12. Each of the plurality of hydraulic motors 112 has a motor shaft 14, shown in FIGS. 5-6, to which a separate cutter blade 1 is attached one-to-one respectively. While circular cutter blades 1 have been disclosed herein, it is contemplated that other types of blades are usable. For instance, an elongated double-edged blade, such as the type used with rotary lawn mowers, could well be substituted for the circular blades.

A hydraulic-motor line 15 is connected in series extending from a first hydraulic motor 1 12 on a left end of the cutter bar 12 to a last hydraulic motor 12 on a right end of the cutter bar 12. The hydraulic-motor line 15 is in fluid communication from a source of pressurized hydraulic fluid to the first of the hydraulic motors 112 and then to consecutive hydraulic motors in series. Hydraulic fluid in the hydraulic-motor line 15 passes through each of the hydraulic motors consecutively in series and then returns to the source of pressurized hydraulic fluid.

The source of hydraulic fluid can be a separate-source pump 16 and separate fluid reservoir 17. Alternatively, the source of hydraulic fluid can be a vehicle-hydraulic system having a vehicle-hydraulic pump 18 and a vehicle-hydraulic reservoir 19 which supply hydraulic fluid also to vehicle-hydraulic components 120 through vehicle-hydraulic lines 21 and vehicle-hydraulic return lines 22.

Whether to use the separate-source pump 16 and separate fluid reservoir 17 or to use the vehicle-hydraulic pump 18 and the vehicle-hydraulic reservoir 19 depends on capacity of the vehicle-hydraulic system. Larger tractors generally have larger hydraulic systems with sufficient capacity to handle this system in addition to vehicle hydraulics. A power takeoff can be used to power a separate hydraulic system if necessary, regardless of capacity of the vehicle hydraulics.

A fundamental feature of this invention is structure for more effective and efficient operation by use of separate hydraulic motors 12 in series. Some trimmers employ a single hydraulic pump with a pulley system that rotates a series of pulleys with each pulley rotating a separate rotary saw blade. The pulley system has a serious problem of stopping all of the saw blades when one saw blade is stopped by a difficult cutting condition. Gear systems from a single hydraulic motor have the same problem. Parallel-hydraulic connection with separate hydraulic lines to and from the hydraulic source for each of a plurality of hydraulic motors results in extremely large flow of fluid, excessive power to pump large amounts of fluid and huge, expensive and heavy hydraulic machinery.

Series connection of a hydraulic-motor line 15 to a plurality of in-line consecutive hydraulic motors 12 turning saw blades 1 at typically 4,000 rpm creates a different kind of problem. It is that the hydraulic motors 12 function as pumps from momentum of saw blades 1 when there is temporary disruption of flow of hydraulic fluid. This occurs when one of the hydraulic motors is stopped or slowed down temporarily by a hard cutting condition such as a thick limb and the rest of the saw blades 1 are cutting comparatively thin limbs or twigs. The hydraulic motors 12 that are fluidly upstream from the stopped or slowed hydraulic pump 12 then function as separate hydraulic pumps and create a combined fluid pressure that often breaks downstream fluid lines, connections or pump parts. Normal pressure is 2,200 psi. Buildup pressure from rotational momentum of rotary cutter blades 1 can be much higher, although it is not easily measurable in operating conditions. The buildup pressure that damages system components is referred to as "spike" pressure.

To solve this spike-pressure problem and still have the advantages of series connection of the hydraulic-motor line 15, this invention employs a plurality of relief lines 23 having first ends connected to the hydraulic-motor line 15 intermediate the hydraulic motors 12 and terminal ends of the relief lines 23 connected to a hydraulic header 24. The hydraulic header 24 is a manifold for containing hydraulic fluid in transit from the hydraulic-motor line 15 to either the separate fluid reservoir 17 or the vehicle hydraulic reservoir 19.

A plurality of one-way check valves 25 structured to allow flow in a direction of the hydraulic header 24 are positioned intermediate the hydraulic-motor line 15 and the hydraulic header 24. A pressure-relief valve 26 is positioned in a header return line 27 that is fluidly intermediate the hydraulic header 24 and either the separate fluid reservoir 17 or the vehicle hydraulic reservoir 10. The pressure-relief valve 26 is adjusted preferably at 2,400 psi for a hydraulic system operating at 2,200 psi. This prevents temporarily high levels of rotational resistance to any one or plurality of the rotary cutter blades 1 from causing buildup of damaging levels of pressure from rotational momentum of upstream hydraulic motors that causes pumping action that exceeds pressure capacity of downstream hydraulic motors 12, lines 15 and other components. A motor return line 28 conveys hydraulic fluid from a last hydraulic motor 12 on a cutter bar 1 under operating conditions generally when some or all of the hydraulic fluid is not returned through the hydraulic header 24 and the header return line 27.

The hydraulic header 24 can be positioned wherever designedly appropriate on the vehicle 6, on the cutter bar 2 or on the hydraulically operative lifting means 5. For this reason, it is shown schematically positioned in FIG. 2 but not shown separately in other figures. For similar reasons, the reservoirs 17 and 19; the pumps 16 and 18; and related hydraulic lines are shown schematically in FIG. 2 but not positioned definitively in other figures.

Referring to FIG. 4, the cutter bar 2 can be raised by hydraulic-lift actuators 9. Simultaneously, the cutter bar ,9 can be oriented vertically as shown or tilted forwardly or rearward with the operative-end hydraulic actuator 10. The hydraulic-lift actuators 9 and the operative-end hydraulic actuator 10 can be vehicle-hydraulic components 20 with a working relationship to vehicle hydraulics that is illustrated schematically in FIG. 3. The operative end 4 of the hydraulically operative lifting means 5 is pivotal on the operative-end axle 7 as described in relation to FIG. 1.

Figure 5:
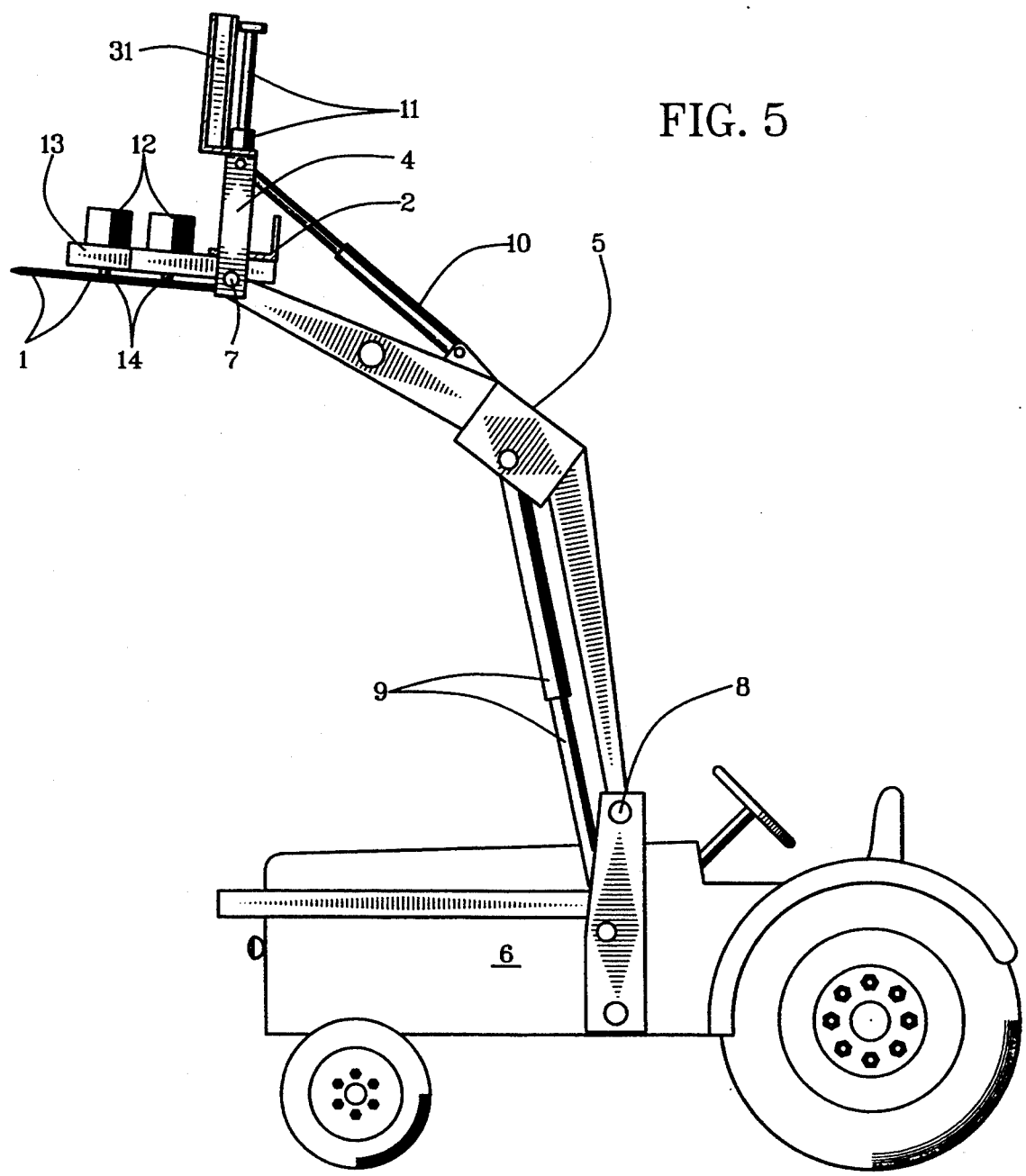
FIG. 5 is a side elevation view with a cutter bar in a raised horizontal mode and with saw blades tilted.
Figure 6:
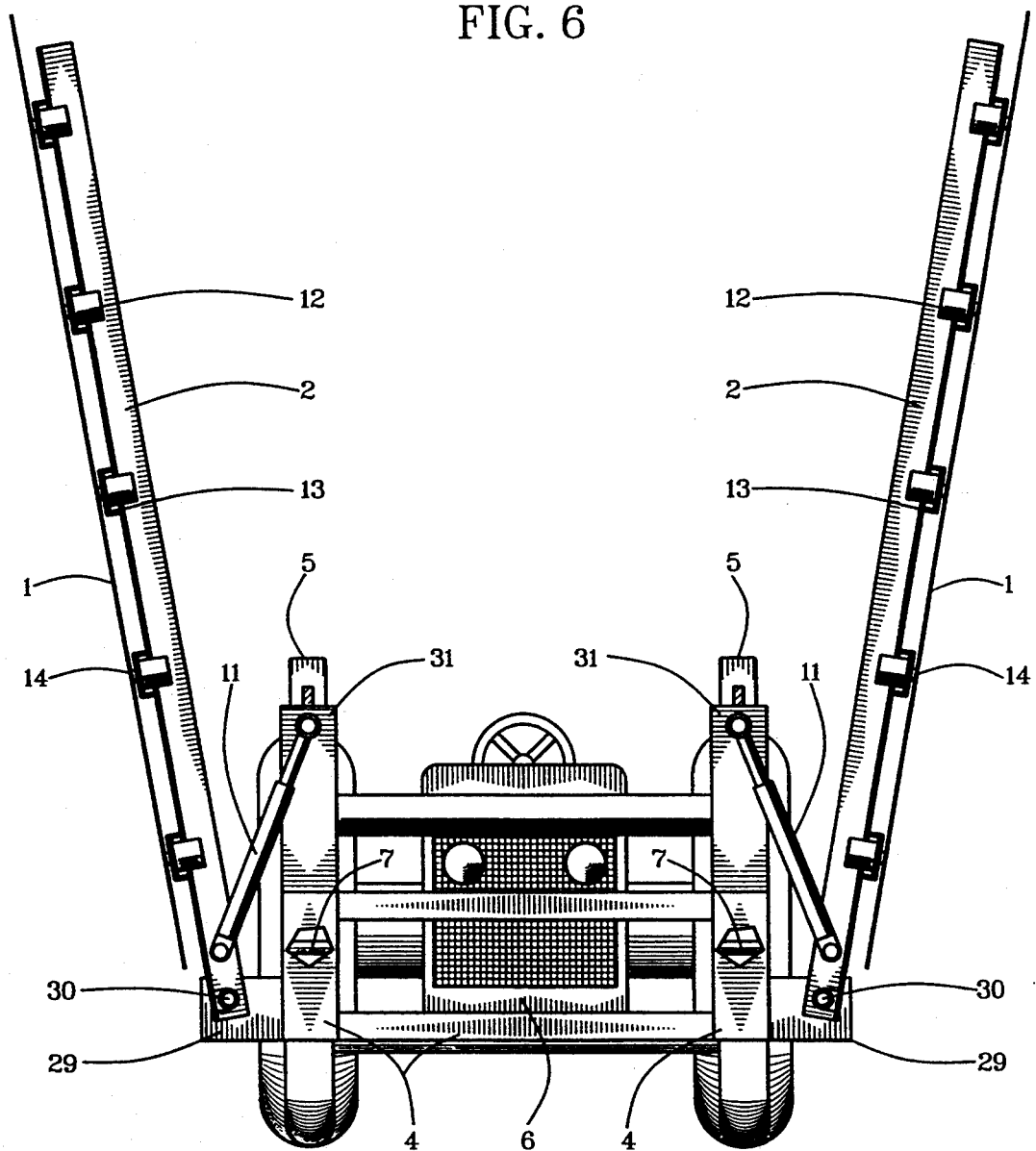
FIG. 6 is a front view of a twin-cutter-bar embodiment with cutter bars pivoted laterally to a select angle for trimming and with saw blades in a linear mode.

Referring to FIG. 5, the cutter bar 2 can be pivoted laterally to a horizontal attitude or to any lateral slant desired with the lateral hydraulic actuator 11. Simultaneously, the cutter bar 2 and the rotary cutting blades 1 can be pivoted approximately ninety degrees in either rotational direction from verticality with the operative-end hydraulic actuator 10. Lateral slant allows adjustment to slopes of trees at less than horizontal attitude, as shown in FIG. 6, and adjustment to topping at horizontal or near-horizontal attitudes of the cutter bar 2, as shown in FIG. 5. Tilting forwardly or aft allows dumping of cuttings from the cutter bar 2. Tilting also allows adjustment to a cutting angle that prevents cuttings from accumulating on the cutter bar 2. For instance, should cuttings build tip on the cutting bar 2 when used in the position shown in FIG. 5, the operator would merely energize actuator 10 to pivot the cutting mechanism rearwardly about pivot 7 and dump the cuttings to the ground. This feature minimizes the build-up of weight on the cutting mechanism.

In this illustration, the cutter bar 2 is an angle beam. An I-beam or a rectangular-tube beam also can be employed. For some design objectives, a rectangular-tube beam can be positioned within a staggering distance between hydraulic motors 12 and hydraulic lines 15, 23 and 28 can be routed through the rectangular-tube beam. This provides rigidity, resistance to rupture and protection of lines while also avoiding buildup of cuttings on the cutter bar 2. For other design purposes, the cutter bar 2 can be a relatively flat rectangular-tube beam from which the hydraulic motors could protrude through orifices from one side and the motor shafts 14 could protrude through orifices from the opposite side. This latter design would be the cleanest, most reliable, lightest and least expensive for some operating conditions. The cutter bar 2 for this design alternative could consist of a short-walled channel beam to which a cover plate could be attachable and detachable for access to hydraulic lines and components carried within it. The simplest and best means for its construction would be to have motor-shaft orifices in a channel-beam floor to which the hydraulic motors 12 would be attachable. Then a cover plate the same width and length of the channel beam would be provided with orifices for protrusion of the hydraulic motors and bolted onto tops of walls of the channel beam. The cover plate could also be an inverted channel beam of the same dimensions but different thickness as desired for enclosing the motors and the lines completely. Other constructions also are foreseeable within the scope of this invention.

Referring to FIGS. 5-6, a lateral mount 29 can be employed for pivotal attachment of a cutter-bar axle 30 to the operative end 4 of the hydraulically 1.5 operative lifting means ! 5 as shown in this front view of a twin-cutter embodiment of this tree-trimming and pruning machine. A lateral-actuator mount 31 can be extended from the operative end 4 for pivotal attachment of the lateral hydraulic actuator 11. Illustrated in a cutaway orifice in the operative end 4 in FIG. 6 and frown a side in FIGS. 1 and 4-5 is the operative-end axle 7.

Reference is made now to FIG. 6. This is a twin-cutter embodiment. It has the same cutter-bar features on each side for trimming adjacent sides of two rows of trees that are properly spaced apart for such dual productivity. A front view of how both sides are attached and operated illustrates correspondingly same features for one side that are described in relation to FIGS. 1-5. Identical components on each side can be designated first-side components for a left side and second-side components for a right side, looking from the front of the vehicle 6 to which they are attached.

Particularly illustrative from this view is lateral pivoting of cutter bars 2 on cutter-bar axle 30 with lateral hydraulic actuator 11. The cutter-bar axle 30 can be attached pivotally to the operative end 4 of the hydraulically operative lifting means 5 with a lateral-actuator mount 31. The rotary cutter blades 1 are shown as one continuous line because they are overlapped in line on cutter bars 2. Hydraulic lines are not shown in this view because they can be contained in some types of cutter bars 2.

Cutter blades 1 on embodiments of this invention can be any size or shape of saw teeth or saw blades. The rotary cutter blades 1 with saw teeth illustrated are representative of any type of rotary cutting component that is attachable to a rotational axle such as the motor shaft 14.

Although a conventional agricultural tractor is illustrated as a vehicle 6 with a hydraulically operative lifting means 5 pivotal on a lifter axle 8 for use with this invention, it is foreseeable also that such lift means as employed for fork lifts can be employed with suitable wheel modifications for operation as an agricultural tractor. For use with a fork-lift type of lift means, the operative end 4 of the hydraulically operative lifting means 5 can be a portion of the fork-lift type of lift means that is proximate a front attachment of lifting forks for a fork lift. The operative-end axle 7 and the cutter-bar axle 30 can be attachable to either or both sides of the portion of the fork-lift type of lift means to which lifting forks can be attachable. Similarly, the operative-end hydraulic actuator 10 and the lateral hydraulic actuator 11 can be attachable to corresponding portions of a fork-attachment as described in relation to front- end-loader means in FIGS. 1 and 4–6.

Various modifications may be made of the invention without departing from the scope thereof and it is desired, therefore, that only such limitations shall be placed thereon as are imposed by the prior art and which are set forth in the appended claims.

What is claimed is:
1. A tree-trimming and pruning machine comprising:
a plurality of rotary cutter blades staggered in line on a cutter bar,
a base end of the cutter bar that is attached pivotally to an operative end of a hydraulically operative lifting means positioned on a vehicle,
the operative end of the hydraulically operative lifting means being pivotal on an operative-end axle that is perpendicular to a lifting plane of the hydraulically operative lifting means,
a lateral hydraulic actuator in pivot-causing relationship laterally between the cutter bar and a side of the operative end of the hydraulically operative lifting means to which the base end of the cutter bar is attached pivotally,
an operative-end hydraulic actuator in pivot-causing relationship linearly between the operative end of the hydraulically operative lifting means and the hydraulically operative lifting means to which its operative end is attached pivotally,
a plurality of hydraulic motors having motor shafts to which the plurality of rotary cutter blades are attached respectively one-to-one,
at least one hydraulic-motor line in fluid communication from a source of pressurized hydraulic fluid to the plurality of hydraulic motors which are positioned consecutively on the cutter bar,
the hydraulic-motor line being connected in a series extending from a first hydraulic motor to a last hydraulic motor of the plurality of hydraulic motors,
a plurality of relief lines having first ends of the plurality of relief lines connected to the hydraulic-motor line and terminal ends of the plurality of relief lines connected to a hydraulic header that is fluidly intermediate the plurality of hydraulic motors and a hydraulic-fluid reservoir,
the plurality of relief lines being in fluid communication between the hydraulic-motor line and the hydraulic header at positions in the hydraulic-motor line that are intermediate adjacent hydraulic motors of the plurality of hydraulic motors,
a plurality of one-way check valves comprised of a one-way check valve proximate each of the plurality of relief lines intermediate the hydraulic-motor line and the hydraulic header,
a pressure-relief valve fluidly intermediate the hydraulic header and the hydraulic-fluid reservoir, and the plurality of one-way check valves and the pressure-relief valve being structured to allow flow of hydraulic fluid from the hydraulic motor line to the hydraulic header and to the hydraulic-fluid reservoir designedly when any of the plurality of hydraulic motors are deterred in speed of rotation due to various cutting conditions, such that temporarily high levels of rotational resistance to any one or plurality of the rotary cutter blades does not cause build-up of damaging levels of pressure from rotational momentum of upstream hydraulic motors that causes pumping action that exceeds pressure capacity of downstream hydraulic components.

2. A tree-trimming and pruning machine as claimed in claim 1 wherein the hydraulically operative lifting means is an operating mechanism for a front-end loader.

3. A tree-trimming and pruning machine as claimed in claim 1 wherein the vehicle on which the hydraulically operative lifting means is positioned is an agricultural tractor.

4. A tree-trimming and pruning machine as claimed in claim 1 wherein the source of pressurized hydraulic fluid to the plurality of hydraulic motors is a hydraulic system on the vehicle.

5. A tree-trimming and pruning machine as claimed in claim 4 wherein the hydraulic system on the vehicle is in fluid-supply relationship also with hydraulic-system actuators which actuate the hydraulically operative lifting means and other hydraulic-system actuators on the vehicle.

6. A tree-trimming and pruning machine comprising:
a first plurality of rotary cutter blades are staggered in line on a first cutter bar,
a second plurality of rotary cutter blades are staggered in line on a second cutter bar,
a base end of the first cutter bar that is attached pivotally to a first side of an operative end of a hydraulically operative lifting means positioned on a vehicle,
a base end of the second cutter bar being attached pivotally to a second side of the operative end of the hydraulically operative lifting means positioned on the vehicle,
the operative end of the hydraulically operative lifting means is pivotal on an operative-end axle that is perpendicular to a lifting plane of the hydraulically operative lifting means,
a first lateral hydraulic actuator in pivot-causing relationship laterally between the first cutter bar and the first side of the operative end of the hydraulically operative lifting means,
a second lateral hydraulic actuator in pivot-causing relationship laterally between the second cutter bar and the second side of the operative end of the hydraulically operative lifting means,
an operative-end hydraulic actuator in pivot-causing relationship linearly between the operative end of the hydraulically operative lifting means and the hydraulically operative lifting means to which its operative end is attached pivotally,
a first plurality of hydraulic motors having motor shafts to which the first plurality of rotary cutter blades are attached respectively one-to-one,
a second plurality of hydraulic motors having motor shafts to which the second plurality of rotary cutter blades are attached respectively one-to-one,
a first hydraulic-motor line in fluid communication from a source of pressurized hydraulic fluid for the first plurality of hydraulic motors which are positioned in line consecutively on the first cutter bar,
the first hydraulic-motor line being connected in a series extending from a first hydraulic motor to a last hydraulic motor of the first plurality of hydraulic motors,
a first plurality of relief lines having first ends of the first plurality of relief lines connected to the first hydraulic-motor line and terminal ends of the first plurality of relief lines connected to a hydraulic header,
the first plurality of relief lines being in fluid communication between the first hydraulic-motor line and the hydraulic header at positions in the first hydraulic-motor line that are intermediate adjacent hydraulic motors of the first plurality of hydraulic motors,
a first plurality of one-way check valves comprised of a one-way check valve proximate each of the first plurality of relief lines intermediate the first hydraulic-motor line and the hydraulic header,
a second hydraulic-motor line in fluid communication from a source of hydraulic fluid to the second plurality of hydraulic motors which are positioned in line consecutively on the second cutter bar,
the second hydraulic-motor line being connected in a series extending from a first hydraulic motor to a last hydraulic motor of the second plurality of hydraulic motors,
a second plurality of relief lines having first ends of the second plurality of relief lines connected to the second hydraulic-motor line and terminal ends of the second plurality of relief lines connected to the hydraulic header that is fluidly intermediate hydraulic pumps and a hydraulic-fluid reservoir,
the second plurality of relief lines being in fluid communication between the second hydraulic-motor line and the hydraulic header at positions in the second hydraulic-motor line that are intermediate adjacent hydraulic motors of the second plurality of hydraulic motors,
a second plurality of one-way check valves comprised of a one-way check valve proximate each of the second plurality of relief lines intermediate the second hydraulic-motor line and the hydraulic header,
a pressure-relief valve fluidly intermediate the hydraulic header and the hydraulic-fluid reservoir, and
the first plurality of one-way check valves, the second plurality of one
way check valves and the pressure-relief valve being structured to allow flow of hydraulic fluid from the first hydraulic motor line and from the second hydraulic-motor line to the hydraulic header and to the hydraulic-fluid reservoir designedly when any of the first plurality of hydraulic motors or of the second plurality of hydraulic motors are deterred in speed of rotation due to various cutting conditions, such that temporarily high levels of rotational resistance to any one or plurality of the rotary cutter blades do not cause buildup of damaging levels of pressure from rotational momentum of upstream hydraulic motors that causes pumping action that exceeds pressure capacity of downstream hydraulic components.

7. A tree-trimming and pruning machine as claimed in claim 6 wherein the hydraulically operative lifting means is an operating mechanism for a front-end loader.

8. A tree-trimming and pruning machine as claimed in claim 6 wherein the vehicle on which the hydraulically operative lifting means is positioned is an agricultural tractor.

9. A tree-trimming and pruning machine as claimed in claim 6 wherein the source of pressurized hydraulic fluid to pluralities of the hydraulic motors is a hydraulic system on the vehicle.

10. A tree-trimming and pruning machine as claimed in claim 9 wherein the hydraulic system on the vehicle is in fluid-supply relationship also with hydraulic-system actuators which actuate the hydraulically operative lifting means and other hydraulic-system actuators on the vehicle.

11. A tree-trimming and pruning machine as claimed in claim 1 wherein, upon actuation of the operative-end hydraulic actuator, the operative lifting means is caused to pivot on the operative-end axle toward the operative-end hydraulic actuator to effect debris dumping frown the machine.

* * * * *